(12) United States Patent
Kae et al.

(10) Patent No.: US 8,732,014 B2
(45) Date of Patent: May 20, 2014

(54) AUTOMATIC CLASSIFICATION OF DISPLAY ADS USING AD IMAGES AND LANDING PAGES

(75) Inventors: Andrew Kae, Staten Island, NY (US); Kin Fai Kan, Sunnyvale, CA (US); Vijay K. Narayanan, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 366 days.

(21) Appl. No.: 12/973,858

(22) Filed: Dec. 20, 2010

(65) Prior Publication Data

US 2012/0158525 A1 Jun. 21, 2012

(51) Int. Cl.
*G06Q 30/00* (2012.01)

(52) U.S. Cl.
USPC ........................................ 705/14.4

(58) Field of Classification Search
None
See application file for complete search history.

(56) References Cited

U.S. PATENT DOCUMENTS

| | | | |
|---|---|---|---|
| 2002/0147637 A1* | 10/2002 | Kraft et al. ................ | 705/14 |
| 2003/0078928 A1* | 4/2003 | Dorosario et al. .............. | 707/10 |
| 2005/0235030 A1* | 10/2005 | Lauckhart et al. ............. | 709/200 |
| 2006/0242147 A1* | 10/2006 | Gehrking et al. ............... | 707/7 |
| 2007/0005418 A1* | 1/2007 | Nishar et al. .................... | 705/14 |
| 2007/0038653 A1* | 2/2007 | Li et al. ......................... | 707/100 |
| 2007/0192181 A1* | 8/2007 | Asdourian ..................... | 705/14 |
| 2007/0198345 A1* | 8/2007 | Park ............................... | 705/14 |
| 2007/0214045 A1* | 9/2007 | Subramanian et al. ......... | 705/14 |
| 2007/0233563 A1* | 10/2007 | Takahashi et al. .............. | 705/14 |
| 2007/0260520 A1* | 11/2007 | Jha et al. ........................ | 705/14 |
| 2007/0300142 A1* | 12/2007 | King et al. .................... | 715/500 |
| 2008/0077494 A1* | 3/2008 | Ozveren et al. ................. | 705/14 |
| 2008/0120646 A1* | 5/2008 | Stern et al. .................... | 725/34 |
| 2008/0235092 A1* | 9/2008 | Song et al. ..................... | 705/14 |
| 2008/0306809 A1* | 12/2008 | Kwak et al. .................... | 705/10 |
| 2009/0043739 A1* | 2/2009 | Choi ................................ | 707/3 |
| 2009/0063265 A1* | 3/2009 | Nomula ......................... | 705/14 |
| 2009/0070310 A1* | 3/2009 | Srivastava et al. ................ | 707/5 |
| 2009/0112840 A1* | 4/2009 | Murdock et al. ................ | 707/5 |
| 2010/0057560 A1* | 3/2010 | Skudlark et al. ........... | 705/14.49 |
| 2010/0082628 A1* | 4/2010 | Scholz ......................... | 707/740 |
| 2010/0094860 A1* | 4/2010 | Lin et al. ..................... | 707/709 |
| 2011/0035289 A1* | 2/2011 | King et al. .................. | 705/14.73 |
| 2011/0082824 A1* | 4/2011 | Allison et al. .................. | 706/20 |
| 2011/0103682 A1* | 5/2011 | Chidlovskii et al. .......... | 382/159 |
| 2011/0166934 A1* | 7/2011 | Comay et al. .............. | 705/14.53 |
| 2011/0225115 A1* | 9/2011 | Moitra et al. .................... | 706/50 |
| 2011/0264522 A1* | 10/2011 | Chan et al. ................. | 705/14.52 |
| 2011/0295678 A1* | 12/2011 | Seldin et al. ............... | 705/14.42 |
| 2012/0036015 A1* | 2/2012 | Sheikh ....................... | 705/14.54 |
| 2012/0045134 A1* | 2/2012 | Perronnin et al. ............ | 382/197 |
| 2012/0072280 A1* | 3/2012 | Lin ............................ | 705/14.45 |
| 2012/0095819 A1* | 4/2012 | Li ............................... | 705/14.23 |
| 2012/0117072 A1* | 5/2012 | Gokturk et al. ............... | 707/740 |
| 2012/0117092 A1* | 5/2012 | Stankiewicz et al. ......... | 707/755 |
| 2012/0190386 A1* | 7/2012 | Anderson .................. | 455/456.3 |
| 2012/0259856 A1* | 10/2012 | Gehrking et al. ............. | 707/739 |

* cited by examiner

Primary Examiner — Matthew T Sittner
(74) Attorney, Agent, or Firm — Buchenhorner Patent Law

(57) ABSTRACT

A system and method for automatically classifying ads into a taxonomy of categories, the method including: extracting text features from ad images using OCR (optical character recognition) techniques; identifying objects of interest from ad images using object detection and recognition techniques in computer vision; extracting text features from the web-page of the advertiser to which the user is re-directed when clicking the ad; training statistical models using the extracted features mentioned above as well as advertiser attributes from a historical dataset of ads labeled by human editors; and determining the relevant categories of unlabeled ads using the trained models.

3 Claims, 2 Drawing Sheets

AUTOMATIC CLASSIFICATION OF DISPLAY ADS USING AD IMAGES AND LANDING PAGES

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of display ad web pages and more particularly relates to the field of classifying display ads.

BACKGROUND OF THE INVENTION

Advertising is a critical economic driver of the internet ecosystem, with internet advertising revenues estimated to be around US $5.9 billion in the first quarter of 2010 alone. This online revenue stream supports the explosive growth of the number of web sites and helps offset the associated infrastructure costs. There are two main types of advertising depending on the nature of the ad creative: textual advertising in which the ads contain text snippets similar to the content of a webpage, and display advertising in which the ads are graphical ad creatives in various formats and sizes (static images, interactive ads that change shape and size depending on the user interaction powered by flash etc.). The text ads are typically displayed either in response to a search query on the search results page, while the display ads are shown on other content pages. Advertisers book display advertising campaigns by specifying the attributes of the site where their ads should be displayed, and/or the attributes of users to whom the ads can be shown. For example, one display advertising campaign can specify that the ads should be shown only on pages related to Sports, and to users who visit those pages from say, the state of California, USA. In addition, the advertiser (or an advertising agency that works on behalf of the advertiser) also specifies the ad creative (the physical ad image) that should be displayed on the user's browser, and the time period over which the ad should run.

Ad serving systems select the ads to show based on the relevance of the ad to either the content of the page, or user, or both. This serving typically involves 2 steps: (i) a matching step which first selects a list of ads that are eligible to be displayed in an ad-serving opportunity depending on the requirements from the advertiser, the attributes of the page, the user, etc., and (ii) a ranking step which then rank orders the list eligible ads based on some objective function (relevance, expected revenue, etc.). The algorithms in these matching and ranking steps leverage data about the available ads, the content of the pages on which the ads are to be shown, the interest of the user etc. Typical display ad campaigns do not require the advertiser to give much more information about the ads themselves, other than that they meet certain quality requirements including for example, the image should not contain any offensive content, should render correctly on the browser.

One common information used in these matching and ranking steps is the category of these component entities (pages, queries, ads), from among a set of relevant user interest categories (e.g., Travel, Finance, Sports). These categories are either assigned manually by editors, or using machine learned categorization tools trained using some historically labeled set of entities. It is typically easier to train machine learned categorization tools to categorize content pages, queries, and text ads, using standard feature construction techniques used in information-retrieval, for example, a bag of words, term-frequency-inverse-document frequency (tf-idf) feature weights etc. Display ads on the other hand do not lend themselves to easy feature representations. Categorization of display ads typically involves large-scale manual labeling by a large team of human editorial experts.

SUMMARY OF THE INVENTION

Briefly, according to an embodiment of the invention a method includes steps or acts of: extracting text features from ad images using OCR (optical character recognition) techniques; identifying objects of interest from ad images using object detection and recognition techniques in computer vision; extracting text features from the web-page of the advertiser that the user is re-directed to when clicking the ad (also called the landing page of the ad); training statistical models using the extracted features as well as the advertiser attributes from a historical dataset of ads labeled by human editors; and determining the relevant categories of unlabeled ads using the trained models.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which.

Figure 1:
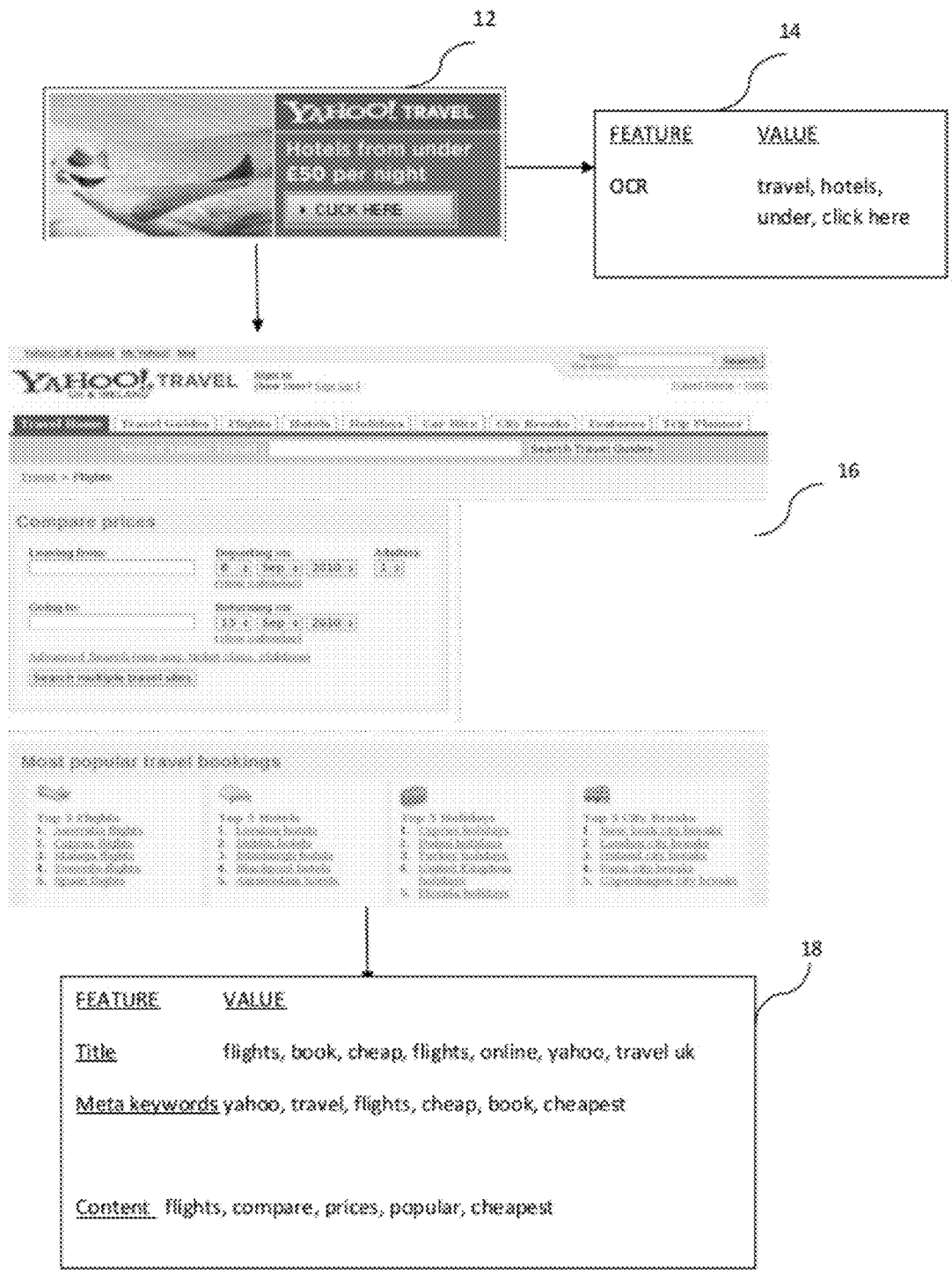
FIG. 1 is a high-level block diagram showing feature extraction from a display ad according to an embodiment of the invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We developed a new method to classify display ads into a taxonomy of categories. The method leverages information from ad images and ad landing pages. We extract text from ad images using OCR techniques. We identify objects of interest from ad images using object detection and recognition techniques in computer vision. We extract text in the title, keywords, and body of ad landing pages. We generate bag-of-words features using the extracted features mentioned above as well as the attributes of advertisers. We train one one-vs-all SVM (support vector machine) classifier for each category in the taxonomy on a historical dataset of ads labeled by human editors. The categories of ads are rolled up according to the taxonomy, e.g., if an ad belongs to automotive/sedan, it also belongs to automotive. To classify a new ad, we compute its score for each category using the corresponding SVM classifier and add the category to its label list if its score is above a certain threshold.

The invention has two major advantages. First, the method leverages information from multiple channels including ad images and landing pages. Signals from multiple channels can reinforce one another. Second, the method extracts text features from ad images which often are more informative than other standard image features (e.g., color, texture).

Referring to FIG. 1 there is an ad image 12 of a display ad and OCR is run on the ad image to extract text features 14. The landing page 16 is parsed to extract text features 18. The landing page 16 is the web-page of the advertiser to which the user is re-directed when clicking the ad. The extracted text features alongside with advertiser attributes (in this case, this advertiser is Yahoo! Travel) are used to categorize the display ad.

Figure 2:
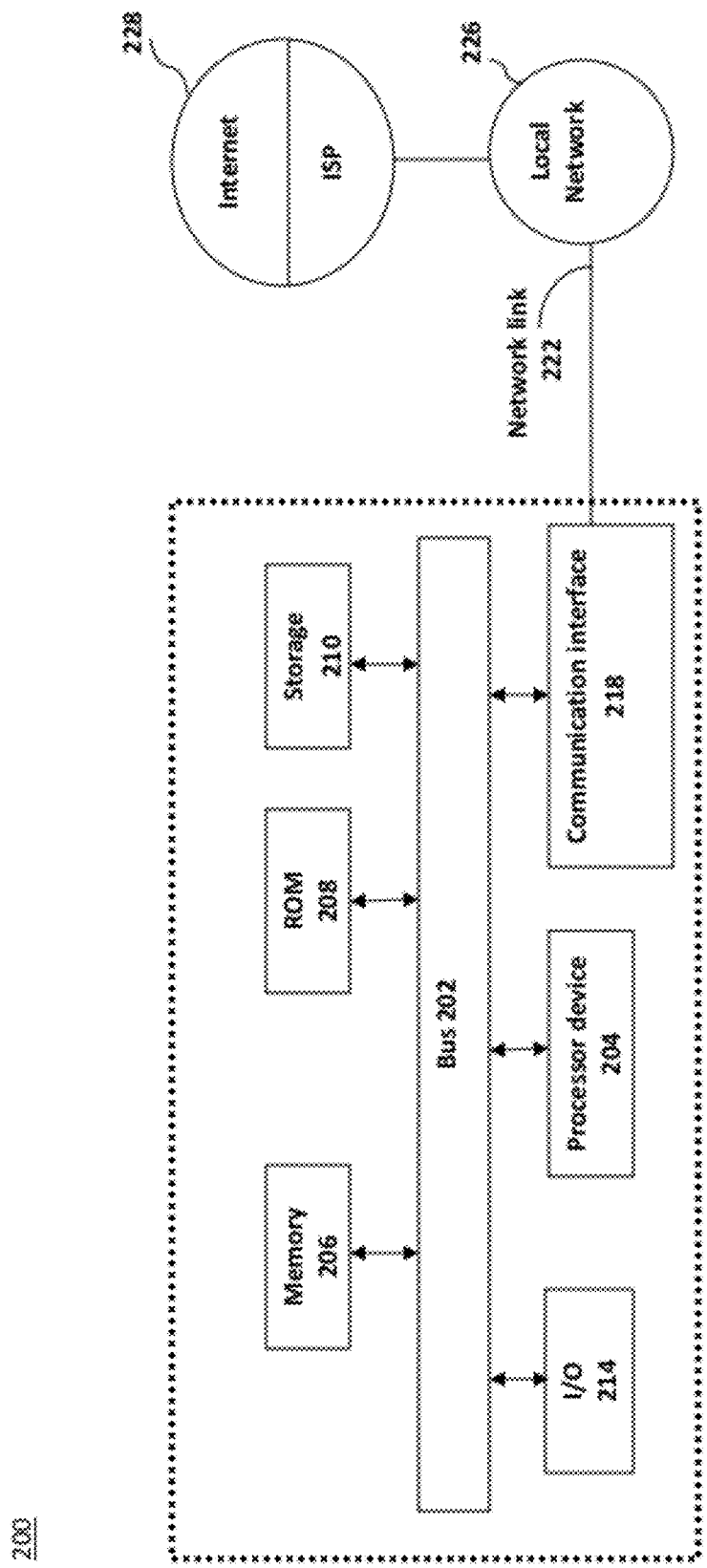
FIG. 2 is a high-level block diagram showing a classification system according to another embodiment of the invention.

Referring to FIG. 2 there is shown a block diagram of a computer system 200 used to classify display ads using ad images and landing pages. The system of categorization of display ads includes inter alia a bus 202 connecting a processor device 204, memory 206, a read-only memory 208, and an information storage device 210 that includes instructions that are executed by the processor device 204 to perform a method of classification of display ads using ad images and landing pages.

The system 200 also includes a communication interface 218 connected to a local area network 226 via a communication link 222. The system 200 performs a method that includes the steps of: reading ad image and landing page (the web-page of the advertiser that the user is re-directed to when clicking the ad) for the ad from a storage device; using a processor device to execute optical character recognition (OCR) to extract text features for ad image; using a processor device to execute object detection and recognition to identify objects of interest from ad image; using a processor device to parse landing page to extract text features; storing the extracted features from ad image and landing page in a storage device; training statistical models using the extracted features as well as advertiser attributes from a historical dataset of ads labeled by human editors; determining the relevant categories of unlabeled ads using the trained models. The system further comprises an input/output device 214.

The invention has multiple uses in display advertising: increasing the ad categorization coverage, scaling up the ad categorization capacity to handle large volumes of ads by reducing the amount of human editorial effort, better utilizing the human editorial experts to focus on categorizing difficult ads and the like. In addition, the ad image and landing page features extracted in this ad categorization system can be used to improve the matching and ranking steps of ad selection algorithms in display ad serving systems.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

We claim:

1. A method for classifying display ads automatically into a taxonomy of categories, the method comprising:
    using a processor device, causing a computer to perform steps of:
        extracting first text features from an ad image of a display ad using optical character recognition (OCR) techniques;
        identifying objects of interest from the ad image using object detection and recognition techniques in computer vision;
        extracting second text features from a title, keywords, and content of a landing page (a web-page of an advertiser that a user is redirected to when clicking an ad) associated with the display ad;
        generating bag-of-words ad features using the extracted first and second text features, as well as attributes of the advertiser;
        using the generated bag-of-words ad features to categorize the display ad;
        training statistical models using the generated bag-of-words ad features on a historical dataset of ads labeled by human editors; and
        determining relevant categories of unlabeled ads using the trained statistical models to classify the display ads.

2. The method of claim 1 further comprising:
    facilitating manual editorial categorization by suggesting categories;
    generating training features and targets in use interests modeling, and generating attributes in match/rank algorithms used in ad selection algorithms.

3. A system of display ad categorization, the system comprising:
    a processor device;
    a storage device operably coupled with the processor device, said storage device comprising instructions that are executed by said processor device;
    wherein the instructions cause a computer to perform a method comprising steps of:
        reading an ad image for a display ad and a landing page associated with said display ad from the storage device;
        extracting first text features from the ad image using optical character recognition (OCR) techniques;
        executing object detection and recognition to identify objects of interest from the ad image;

parsing the landing page to extract second text features from a title, keywords, and content of said landing page;

generating bag-of-words ad features using the extracted first and second text features, as well as attributes of the advertiser;

using the generated bag-of-words ad features to categorize the display ad;

storing the extracted first and second text features from the ad image and the landing page in the storage device;

training statistical models using the generated bag of words ad features on a historical dataset of ads labeled by human editors; and determining relevant categories of unlabeled ads using the trained statistical models to classify the display ads.

\* \* \* \* \*